US009284793B2

(12) United States Patent
D'Silva et al.

(10) Patent No.: US 9,284,793 B2
(45) Date of Patent: Mar. 15, 2016

(54) EXTERNALLY SERVICEABLE SLIP RING APPARATUS

(71) Applicants: Alben D'Silva, Edmonton (CA); Mesfin Ayele Demissie, Edmonton (CA)

(72) Inventors: Alben D'Silva, Edmonton (CA); Mesfin Ayele Demissie, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 275 days.

(21) Appl. No.: 14/078,880

(22) Filed: Nov. 13, 2013

(65) Prior Publication Data

US 2015/0129319 A1    May 14, 2015

(51) Int. Cl.

| | | |
|---|---|---|
| E21B 4/04 | (2006.01) |
| E21B 7/04 | (2006.01) |
| H01R 39/08 | (2006.01) |
| H01R 39/12 | (2006.01) |
| E21B 17/02 | (2006.01) |
| B23P 6/00 | (2006.01) |
| H01R 39/38 | (2006.01) |
| H01R 43/14 | (2006.01) |
| H01R 13/52 | (2006.01) |
| H01R 39/24 | (2006.01) |

(52) U.S. Cl.
CPC .............. *E21B 17/028* (2013.01); *B23P 6/00* (2013.01); *H01R 39/12* (2013.01); *H01R 39/385* (2013.01); *H01R 43/14* (2013.01); *H01R 13/5213* (2013.01); *H01R 39/24* (2013.01); *Y10T 29/4973* (2015.01); *Y10T 29/49721* (2015.01); *Y10T 29/49723* (2015.01)

(58) Field of Classification Search
CPC ............. E21B 4/04; E21B 7/04; E21B 7/046; E21B 7/06; E21B 7/062; E21B 17/028; H01R 39/08; H01R 39/12; H01R 43/14

USPC ..................... 166/65.1; 175/61; 439/190, 577
See application file for complete search history.

(56) References Cited

U.S. PATENT DOCUMENTS

| | | | | |
|---|---|---|---|---|
| 3,387,155 | A | * | 6/1968 | Krulls ...................... H02K 5/14 310/239 |
| 4,537,457 | A | * | 8/1985 | Davis, Jr. .............. E21B 17/028 439/190 |
| 4,544,215 | A | | 10/1985 | Fritsch |
| 6,244,361 | B1 | | 6/2001 | Comeau et al. |
| 6,769,499 | B2 | | 8/2004 | Cargill et al. |
| 6,899,174 | B2 | * | 5/2005 | Maxwell ................. E21B 47/01 166/117.7 |

(Continued)

FOREIGN PATENT DOCUMENTS

EP        1643602 A1     4/2006

*Primary Examiner* — Kenneth L Thompson
(74) *Attorney, Agent, or Firm* — Terrence N. Kuharchuk; Parlee McLaws LLP; Clive D. Menezes

(57) ABSTRACT

A slip ring apparatus which includes a housing, a contact assembly recess defined by the housing, a slip ring rotor assembly contained within the interior of the housing adjacent to the contact assembly recess, a slip ring contact assembly mounted within the interior of the housing, wherein the slip ring contact assembly is insertable and removable from the interior of the housing via an exterior recess side of the contact assembly recess, and a hatch cover for covering the contact assembly recess, wherein the hatch cover is removable and replaceable via the exterior recess side of the contact assembly recess. A method of servicing a slip ring apparatus which includes removing a hatch cover, servicing the slip ring apparatus, and replacing the hatch cover, all via an exterior recess side of the contact assembly recess.

23 Claims, 5 Drawing Sheets

(56) References Cited

U.S. PATENT DOCUMENTS

| | | |
|---|---|---|
| 7,320,363 B2 | 1/2008 | Sand et al. |
| 8,157,002 B2 | 4/2012 | Clarkson et al. |
| 2004/0263022 A1 | 12/2004 | Yu |
| 2007/0210671 A1 | 9/2007 | McMillan et al. |
| 2015/0129313 A1 * | 5/2015 | Zacharko ............... H01R 39/46 175/73 |

* cited by examiner

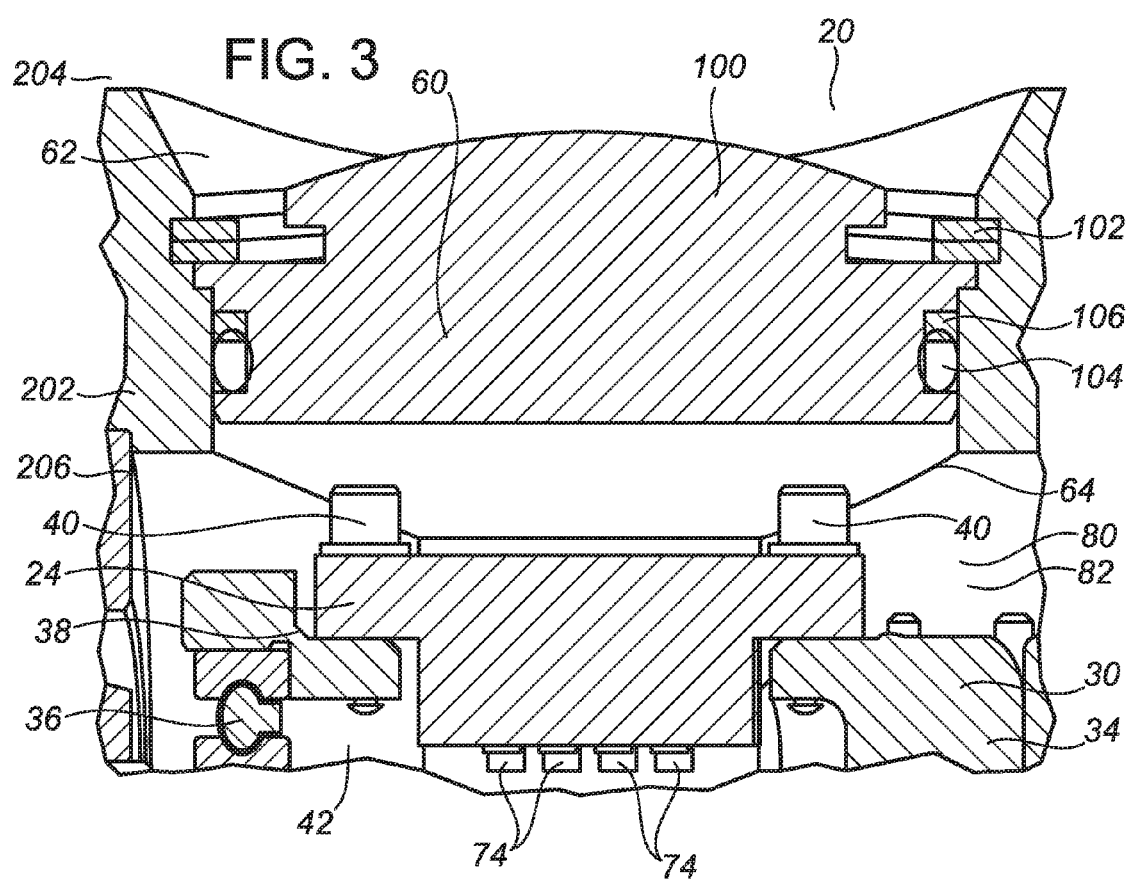
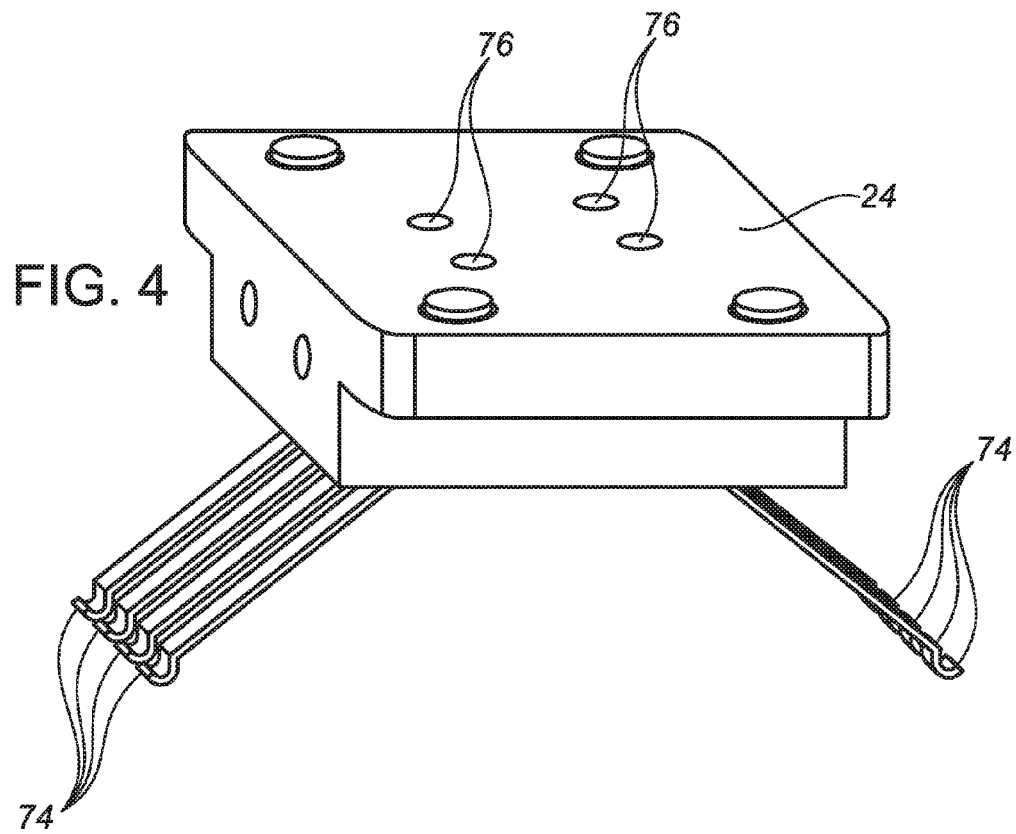

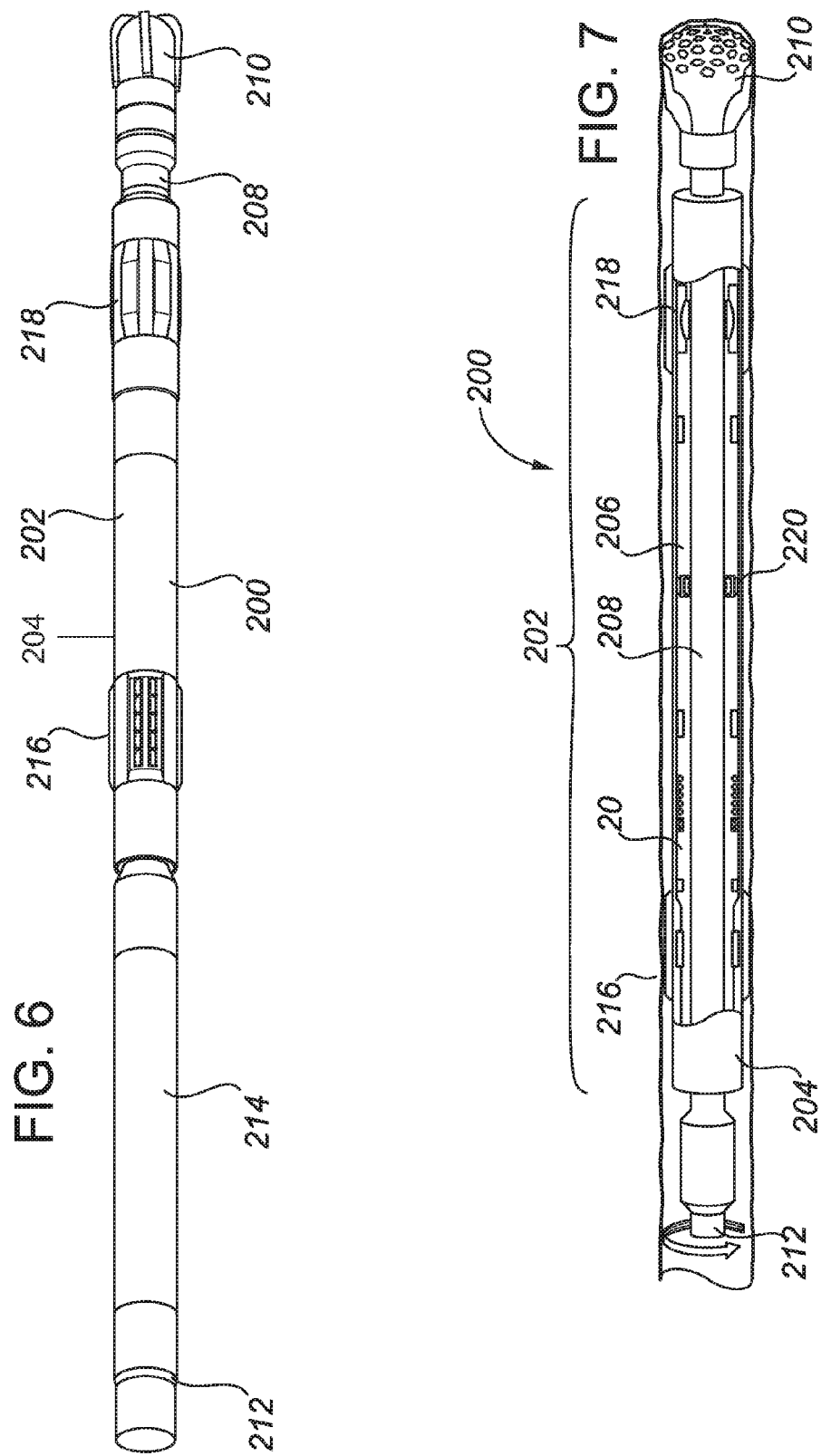

US 9,284,793 B2

EXTERNALLY SERVICEABLE SLIP RING APPARATUS

TECHNICAL FIELD

A slip ring apparatus with a slip ring contact assembly which is serviceable via an exterior recess side of a contact assembly recess in a housing.

BACKGROUND OF THE INVENTION

Slip ring apparatus are commonly used in a variety of applications to transfer electrical energy, including electrical power and/or signals over one or more channels between portions of an apparatus which experience relative rotation.

As a non-limiting example, slip ring apparatus may be used in a variety of downhole applications as components of apparatus which are adapted to be inserted within boreholes. Such apparatus may include without limitation, borehole drilling apparatus, wellbore completion apparatus, wellbore logging apparatus, and/or wellbore production apparatus.

A slip ring apparatus may be immersed in a dielectric fluid during its operation. The dielectric fluid creates the potential for a "hydroplaning effect" in which the dielectric fluid may cause the components of the slip ring apparatus to lose contact as they rotate relative to each other.

The potential hydroplaning effect may tend to increase as the viscosity of the dielectric fluid increases and to decrease as the engagement force between the components of the slip ring apparatus increases. A desired engagement force between the components of a slip ring apparatus may be provided by preloading the slip ring apparatus in order to provide the desired engagement force.

The viscosity of the dielectric fluid in which a slip ring apparatus is immersed may vary, depending upon the operational temperature and requirements of the apparatus in which the slip ring apparatus is used and the properties of the dielectric fluid.

BRIEF DESCRIPTION OF DRAWINGS

Embodiments of the invention will now be described with reference to the accompanying drawings, in which:

FIG. 3 is a detail drawing of a slip ring contact assembly and a hatch cover in the exemplary embodiment of slip ring apparatus depicted in FIG. 1.

FIG. 4 is a pictorial view of a slip ring contact assembly in the exemplary embodiment of slip ring apparatus depicted in FIG. 1.

FIG. 6 is a pictorial view of an exemplary rotary steerable drilling apparatus, shown connected with a drill string.

FIG. 7 is a schematic longitudinal section assembly view of the exemplary rotary steerable drilling apparatus depicted in FIG. 6, shown disconnected from the drill string.

DETAILED DESCRIPTION

Figure 1:
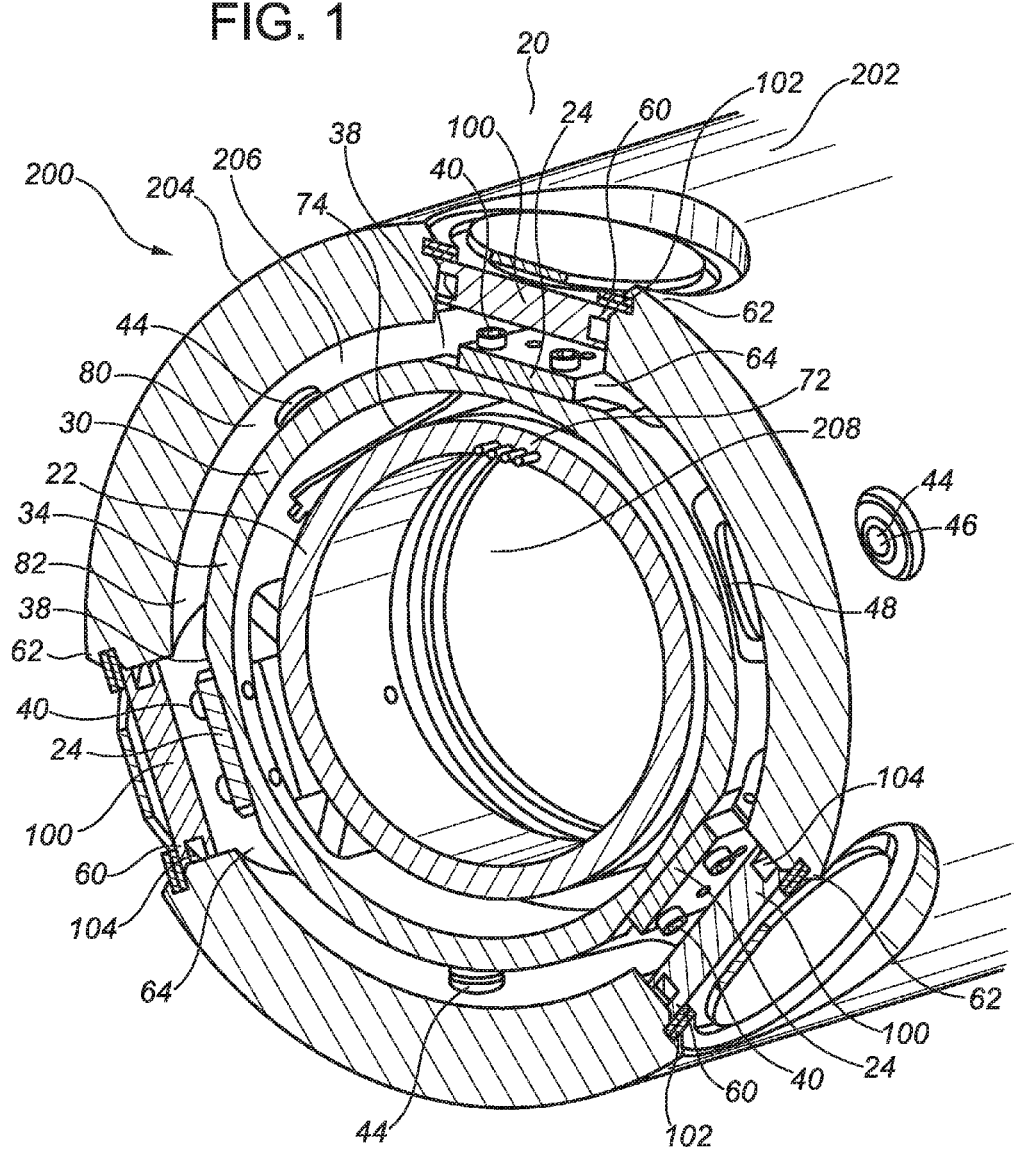
FIG. 1 is a pictorial transverse cross-section view of an exemplary embodiment of a slip ring apparatus.

References in this document to orientations, to operating parameters, to ranges, to lower limits of ranges, and to upper limits of ranges are not intended to provide strict boundaries for the scope of the disclosure, but should be construed to mean "approximately" or "about" or "substantially", within the scope of the teachings of this document, unless expressly stated otherwise.

The present disclosure is directed at a slip ring apparatus, at a variety of apparatus comprising the slip ring apparatus, and at a method of servicing a slip ring apparatus.

The slip ring apparatus may be used in any apparatus in which it is desired to transfer electrical energy, including electrical power and/or signals, over one or more channels between portions of the apparatus which experience relative rotation.

In some embodiments, the apparatus in which the slip ring apparatus is used may be configured to be inserted within a borehole. In some embodiments, the apparatus in which the slip ring apparatus is used may be an apparatus for use in drilling a borehole. In some embodiments, the apparatus in which the slip ring apparatus is used may be a drilling motor. In some embodiments, the apparatus in which the slip ring apparatus is used may be a rotary steerable drilling apparatus.

The slip ring apparatus is comprised of a slip ring rotor assembly and at least one slip ring contact assembly. The slip ring rotor assembly and the at least one slip ring contact assembly are electrically connected with each other and are rotatable relative to each other.

In some embodiments, the slip ring apparatus may be comprised of a plurality of slip ring contact assemblies to provide redundancy and/or to facilitate a plurality of electric paths or channels.

In some embodiments, the slip ring apparatus may be further comprised of a housing. The housing may be a dedicated slip ring apparatus housing, or the housing may be a component of an apparatus in which the slip ring apparatus is used.

In some embodiments, the housing may define at least one contact assembly recess. In some embodiments, the number of contact assembly recesses may be equal to the number of slip ring contact assemblies, so that each slip ring contact assembly has a corresponding contact assembly recess. In some embodiments, a plurality of contact assembly recesses may be spaced around a circumference of the housing. In some embodiments, a plurality of contact assembly recesses may be equally spaced around a circumference of the housing.

In some embodiments, each of the contact assembly recesses may have an exterior recess side which is accessible from an exterior of the housing and an interior recess side which is in communication with an interior of the housing.

In some embodiments, the slip ring rotor assembly may be contained within the interior of the housing. The slip ring rotor assembly may be adjacent to the interior recess sides of the contact assembly recesses so that the slip ring rotor assembly can be aligned with the slip ring contact assemblies. The slip ring rotor assembly may be rotatable relative to the housing.

In some embodiments, the apparatus in which the slip ring apparatus is used may be comprised of a shaft which rotatably extends through the interior of the housing. In some embodiments, the slip ring rotor assembly may be connected with the shaft so that the slip ring rotor assembly rotates with the shaft.

In some embodiments, the at least one slip ring contact assembly may be mounted within the housing so that the slip ring rotor assembly is rotatable relative to the at least one slip ring contact assembly.

In some embodiments, a slip ring contact assembly may be insertable into the interior of the housing and may be removable from the interior of the housing via the exterior recess side of a contact assembly recess. In some embodiments, each of a plurality of slip ring contact assemblies may be insertable into and removable from the interior of the housing via the exterior recess side of a corresponding contact assembly recess.

In some embodiments, the slip ring apparatus may be further comprised of at least one hatch cover for covering the at least one contact assembly recess. A hatch cover may cover a contact assembly recess in any suitable manner including, without limitation, by being placed over the exterior recess side of the contact assembly recess or by being placed within the contact assembly recess.

In some embodiments, a hatch cover may be removable and replaceable via the exterior recess side of a contact assembly recess. In some embodiments, a plurality of hatch covers may be removable and replaceable via the exterior recess sides of a plurality of contact assembly recesses.

In some embodiments, a hatch cover seal may be provided between a hatch cover and a hatch cover recess.

In some embodiments, the slip ring apparatus may be further comprised of a dielectric fluid. The slip ring rotor assembly and the at least one slip ring contact assembly may be immersed in the dielectric fluid. In some embodiments, the slip ring apparatus may be further comprised of a dielectric fluid chamber surrounding the slip ring rotor assembly and the at least one slip ring contact assembly, for containing the dielectric fluid.

The slip ring rotor assembly may be comprised of at least one electrically conductive ring. In some embodiments, the slip ring rotor assembly may be comprised of a plurality of conductive rings to provide redundancy and/or to facilitate a plurality of electric paths or channels.

Each slip ring contact assembly may be comprised of at least one electrically conductive contact element. In some embodiments, a slip ring contact assembly may be comprised of a plurality of contact elements to provide redundancy and/or to facilitate a plurality of electric paths or channels.

A conductive ring may be engaged with at least one contact element of a slip ring contact assembly so that the slip ring rotor assembly is electrically connected with the slip ring contact assembly.

Each slip ring contact assembly engages the slip ring rotor assembly with an engagement force. In some embodiments, each contact element of a slip ring contact assembly engages a conductive ring of the slip ring rotor assembly with an engagement force.

In some embodiments, the slip ring apparatus may be serviceable via the exterior recess side of a contact assembly recess. Servicing the slip ring apparatus may be comprised of adjusting, maintaining, repairing and/or replacing a slip ring contact assembly.

In some particular embodiments, the engagement force between the slip ring rotor assembly and the slip ring contact assembly, and/or the engagement force between a contact element of a slip ring contact assembly and a conductive ring of the slip ring rotor assembly may be adjustable via the exterior recess side of a contact assembly recess.

In some embodiments, servicing the slip ring apparatus may be comprised of removing a hatch cover via the exterior side of a contact assembly recess, servicing the slip ring via the exterior recess side of the contact assembly recess, and replacing the hatch cover via the exterior recess side of the contact assembly recess.

In some embodiments, replacing a slip ring contact assembly may be comprised of dismounting the slip ring contact assembly from the interior of the housing via the exterior recess side of a contact assembly recess, removing the slip ring contact assembly from the interior of the housing via the exterior recess side of the contact assembly recess, inserting a replacement slip ring contact assembly into the interior of the housing via the exterior recess side of the contact assembly recess, and mounting the replacement slip ring within the interior of the housing via the exterior recess side of the contact assembly recess.

FIGS. 1-5 depict an exemplary embodiment of a slip ring apparatus, in which the slip ring apparatus is provided as a component of an apparatus such as a rotary steerable drilling apparatus. FIGS. 6-7 depict an exemplary rotary steerable drilling apparatus in which the slip ring apparatus may be used.

Other embodiments of the slip ring apparatus (20) may be included in other apparatus within the scope of the present disclosure.

Referring to FIG. 1, an exemplary embodiment of a slip ring apparatus (20) is included in an exemplary rotary steerable drilling apparatus (200).

As non-limiting examples, the exemplary rotary steerable apparatus (200) may be a rotary steerable drilling apparatus of the type described in U.S. Pat. No. 6,244,361 (Comeau et al) and/or U.S. Pat. No. 6,769,499 (Cargill et al). As a non-limiting example, the slip ring apparatus (20) may be used in these apparatus to replace or supplement the electromagnetic coupling device which provides a communication link between the housing and the shaft in these rotary steerable drilling apparatus.

Referring to FIGS. 6-7, the exemplary rotary steerable drilling apparatus (200) is comprised of a housing (202) having an exterior (204) and an interior (206). A shaft (208) extends through the interior (206) of the housing (202). The shaft (208) is rotatable relative to the housing (202).

In the exemplary rotary steerable apparatus (200), a drill bit (210) is connected with a distal end of the shaft (208), and a drill string (212) is connected with a proximal end of the shaft (208). The drill string (212) may include a drill string communication system (214) such as a measurement-while-drilling system.

In the exemplary rotary steerable drilling apparatus (200), an anti-rotation device (216) is connected with or integrated into the housing (202) adjacent to a proximal end of the housing (202), and a near-bit stabilizer (218) is connected with or integrated into the housing (202) adjacent to a distal end of the housing (202).

In the exemplary rotary steerable drilling apparatus (200), a deflection mechanism (220) is contained within the housing (202), for deflecting the shaft (208) in order to provide a desired drilling direction.

Referring to FIGS. 1-5, in the exemplary embodiment, the slip ring apparatus (20) is comprised of one slip ring rotor assembly (22) and three slip ring contact assemblies (24).

In the exemplary embodiment, the slip ring rotor assembly (22) is connected with the shaft (208) so that the slip ring rotor assembly (22) is contained within the interior (206) of the housing (202) and so that the slip ring rotor assembly (22) is rotatable with the shaft (208) relative to the housing (202). The slip ring rotor assembly (22) may be connected with the shaft (208) in any suitable manner.

In the exemplary embodiment, the slip ring contact assemblies (24) are mounted within the interior (206) of the housing (202) so that the slip ring rotor assembly (22) is rotatable relative to the slip ring contact assemblies (24).

In the exemplary embodiment, a shoulder (28) is defined within the interior (206) of the housing (202). The shoulder (28) may be defined by the housing (202), or the shoulder (28)

may be defined by or comprised of a component of the apparatus (200) which is separate from the housing (202).

In the exemplary embodiment, the slip ring apparatus (20) is further comprised of a slip ring mounting assembly (30) which is contained within the interior (206) of the housing (202), which is interposed radially between the housing (202) and the shaft (208), and which abuts the shoulder (28).

In the exemplary embodiment, the slip ring mounting assembly (30) is comprised of a contact assembly mounting collar (34) connected with the housing (202) for mounting the contact assemblies (24) within the interior (206) of the housing (202), and slip ring bearings (36) for facilitating rotation of the contact assembly mounting collar (34) relative to both the slip ring rotor assembly (22) and the shaft (208).

In the exemplary embodiment, the contact assembly mounting collar (34) is comprised of three contact assembly mounts (38) which are equally spaced around a circumference of the contact assembly mounting collar (34). In the exemplary embodiment, each of the slip ring contact assemblies (24) is mounted to its respective contact assembly mount (36) with four mounting screws (40) and washers.

The slip ring rotor assembly (22) is positioned adjacent to the three contact assembly mounts (38) so that the slip ring rotor assembly (22) is aligned with the contact assembly mounts (38). Each of the contact assembly mounts (38) defines a mounting aperture (42) which facilitates engagement between the slip ring rotor assembly (22) and the slip ring contact assemblies (24) when the slip ring contact assemblies (24) are mounted in the contact assembly mounts (38).

The slip ring rotor assembly (22) is rotatable relative to the slip ring contact assemblies (24). In the exemplary embodiment, the relative rotation between the slip ring rotor assembly (22) and the slip ring contact assemblies (24) is facilitated by the slip ring bearings (36).

The slip ring contact assemblies (24) may be fixed to the housing (202) so that the slip ring rotor assembly (22) is rotatable relative to the slip ring contact assemblies (24) as the shaft (208) rotates relative to the housing (202). The slip ring contact assemblies (24) may be fixed to the housing (202) in any suitable manner.

In the exemplary embodiment, the contact assembly mounting collar (34) is fixed to the housing (202) in order to fix the slip ring contact assemblies (24) to the housing (202). More particularly, in the exemplary embodiment, the slip ring mounting assembly (30) is comprised of three locking pins (44) for locking the contact assembly mounting collar (34) to the housing (202). The locking pins (44) extend through locking bores (46) in the housing (202) and engage with locking recesses (48) in the contact assembly mounting collar (34) in order to prevent rotation of the contact assembly mounting collar (34) relative to the housing (202). In the exemplary embodiment, each of the locking pins (44) is retained in the housing (202) by a threaded connection (50) and with a snap ring (52), and is provided with an O-ring seal (54) to prevent fluids from transferring between the exterior (204) and the interior (206) of the housing (202) through the locking bores (46).

Figure 2:
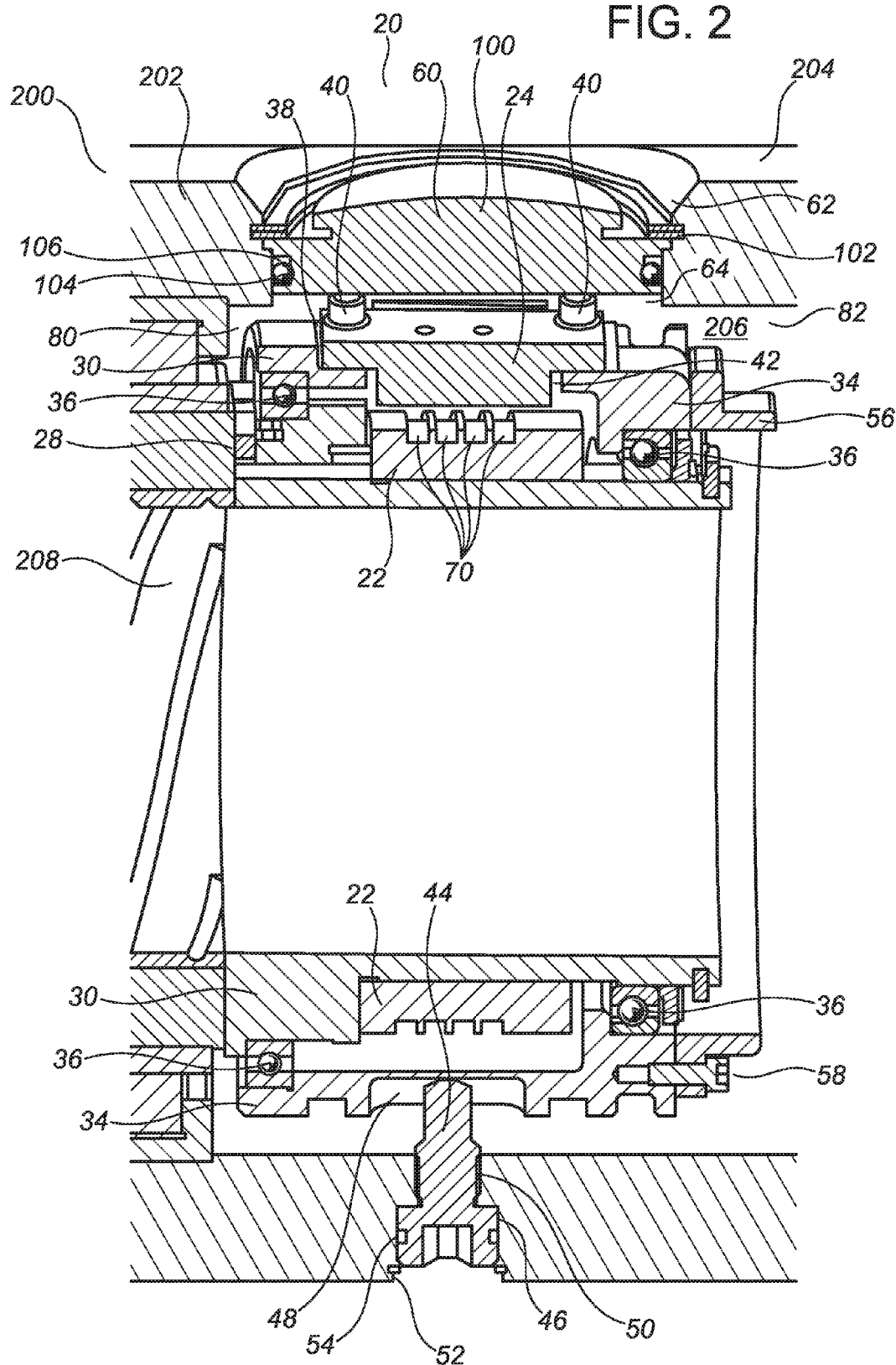
FIG. 2 is a longitudinal section assembly view of the exemplary embodiment of slip ring apparatus depicted in FIG. 1.
Figure 5:
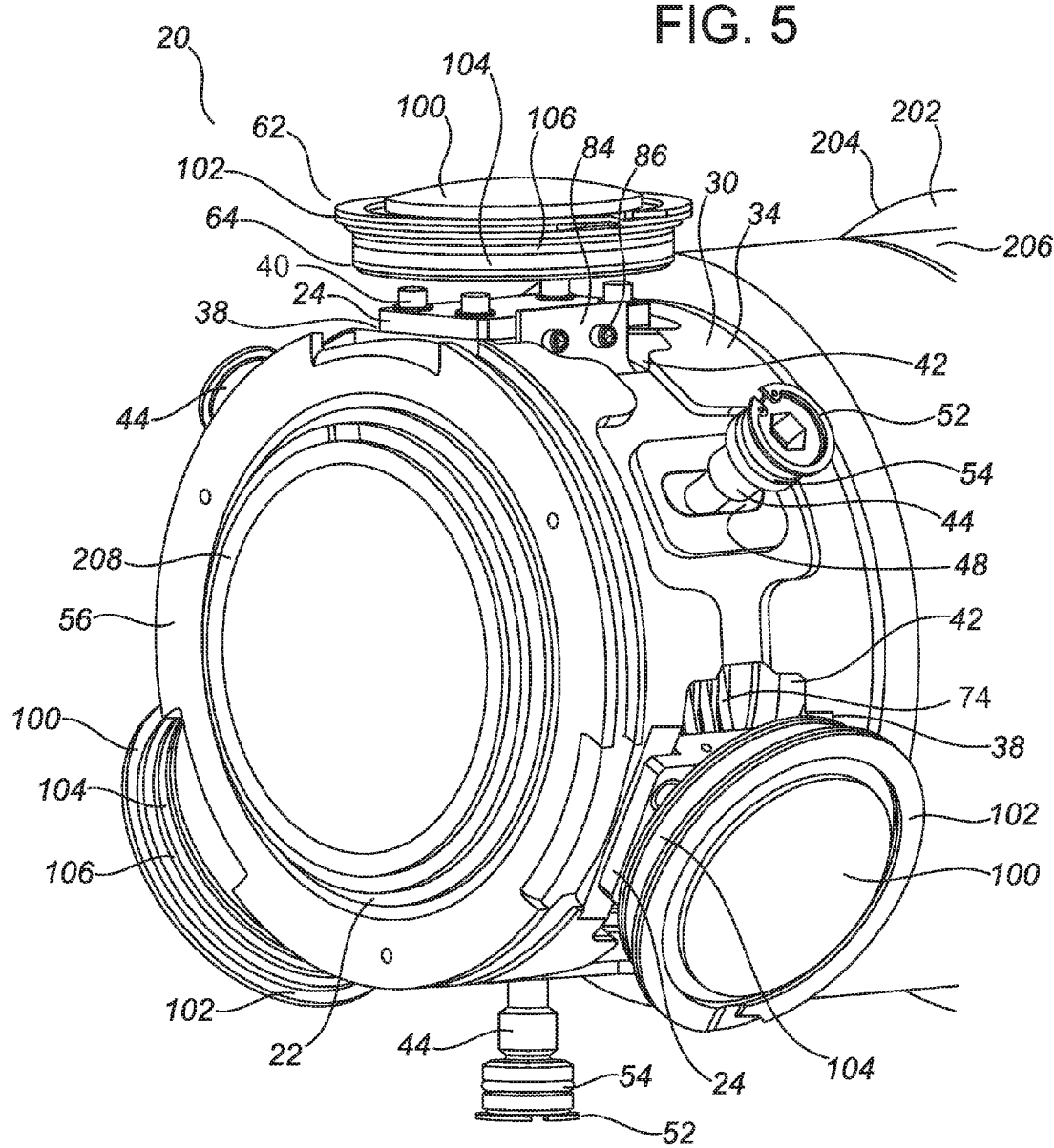
FIG. 5 is a pictorial partial cutaway view of the exemplary embodiment of slip ring apparatus depicted in FIG. 1, in which the housing has been removed to more clearly depict the features of the slip ring apparatus.

Referring to FIG. 2 and FIG. 5, in the exemplary embodiment, the slip ring mounting assembly (30) is further comprised of an annular end plate (56) which is mounted on an end of the contact assembly mounting collar (34) with end plate bolts (58). As a result, in the exemplary embodiment, the slip ring rotor assembly (22) and the slip ring contact assemblies (24) are interposed between the end plate (56) and the shoulder (28) defined by the interior (206) of the housing (202).

In the exemplary embodiment, the housing (202) defines three contact assembly recesses (60), so that each of the three slip ring contact assemblies (24) has a corresponding contact assembly recess (60).

Each of the contact assembly recesses (60) has an exterior recess side (62) which is accessible from the exterior (204) of the housing (202) and an interior recess side (64) which is in communication with the interior (206) of the housing (202).

In the exemplary embodiment, the three contact assembly recesses (60) are equally spaced around a circumference of the housing (202) adjacent to the three contact assembly mounts (38), so that the contact assembly recesses (60) are aligned with the contact assembly mounts (38).

Since the contact assembly mounts (38) are positioned adjacent to the slip ring rotor assembly (22), the slip ring rotor assembly (22) is also positioned adjacent to the interior recess sides (64) of the contact assembly recesses (60).

The slip ring contact assemblies (24) are insertable into the interior (206) of the housing (202) and are removable from the interior (206) of the housing (202) via the exterior recess sides (62) of the contact assembly recesses (60). In this regard, the contact assembly recesses (60) are sized to permit the passage of a slip ring contact assembly (24) therethrough.

The slip ring contact assemblies (24) may also be mounted within the interior (206) of the housing (202) and dismounted from the interior (206) of the housing (202) via the exterior recess sides (62) of the contact assembly recesses (60).

In the exemplary embodiment, the slip ring contact assemblies (24) may more particularly be mounted to the contact assembly mounting collar (34) and dismounted from the contact assembly mounting collar (34) via the exterior recess sides (62) of the contact assembly recesses (60). In this regard, the contact assembly mounts (38) on the contact assembly mounting collar (34) and the mounting screws (40) for the slip ring contact assemblies (24) are both accessible via the exterior recess sides (62) of the contact assembly recesses (60).

The slip ring rotor assembly (22) is comprised of at least one electrically conductive ring (70). In the exemplary embodiment, the slip ring rotor assembly (22) is comprised of four electrically conductive rings (70) separated by a dielectric material. In the exemplary embodiment, the four conductive rings (70) provide four separate electrical channels or paths.

Referring to FIG. 1, the four conductive rings (70) are electrically connected with four electrical leads (72) which extend axially through the slip ring rotor assembly (22) and which may be connected with electrical power and/or communication devices (not shown) which may be associated with the shaft (208).

Each of the slip ring contact assemblies (24) is comprised of at least one electrically conductive contact element (74). A contact element (74) may be comprised of any suitable structure, device or apparatus including, without limitation, a brush or a finger.

In the exemplary embodiment, each of the slip ring contact assemblies (24) is comprised of four pairs of electrically conductive contact elements (74).

In the exemplary embodiment, each of the pairs of contact elements (74) is engaged with one of the conductive rings (70) on the slip ring rotor assembly (22), so that each of the slip ring contact assemblies (24) is electrically connected with the slip ring rotor assembly (22) to provide four separate electrical channels or paths and two contact elements (74) for each electrical channel or path, and so that the three slip ring contact assemblies (24) provide redundancy to assist in maintaining a constant electrical connection between the slip ring rotor assembly (22) and at least one of the slip ring contact assemblies (24).

Referring to FIGS. 3-4, the four pairs of contact elements (74) are electrically connected with four electrical leads (76) which extend radially through the slip ring contact assemblies (24) and which may be connected with electrical power and/or communication devices (not shown) which may be associated with the housing (202).

In the exemplary embodiment, the slip ring apparatus (20) is further comprised of a dielectric fluid chamber (80) which surrounds the slip ring rotor assembly (22) and the slip ring contact assemblies (24). In the exemplary embodiment, the dielectric fluid chamber (80) is defined within the rotary steerable drilling apparatus (200). A dielectric fluid (82) is contained in the dielectric fluid chamber (80) so that the slip ring rotor assembly (22) and the slip ring contact assemblies (24) are immersed in the dielectric fluid (82).

Referring to FIG. 5, in the exemplary embodiment, a fluid shield (84) is mounted within each of the contact assembly mounts (38) on the "leading side" of the slip ring contact assemblies (24) so that the interface of engagement between the slip ring rotor assembly (22) and the slip ring contact assemblies (24) is at least partially isolated from the circulation of the dielectric fluid (82) within the dielectric fluid chamber (80). In the exemplary embodiment, each fluid shield (84) is mounted to the leading side of the slip ring contact assemblies (24) with fluid shield screws (86).

Referring to FIG. 3 and FIG. 5, the exemplary embodiment of the slip ring apparatus (20) is comprised of three hatch covers (100) for covering each of the three contact assembly recesses (60). In the exemplary embodiment, the hatch covers (100) are removable and replaceable via the exterior recess sides (62) of the contact assembly recesses (60).

In the exemplary embodiment, the hatch covers (100) are positioned within the contact assembly recesses (60) and are retained within the contact assembly recesses (60) by retaining rings (102), which are removable and replaceable via the exterior recess sides (62) of the contact assembly recesses (60).

In the exemplary embodiment, each of the hatch covers (100) is provided with a hatch cover seal (104) for preventing fluids from transferring between the exterior (204) and the interior (206) of the housing (202) through the contact assembly recesses (60). In the exemplary embodiment, the hatch cover seals (104) are O-ring seals, which are retained within the hatch covers (100) with backup rings (106).

In the exemplary embodiment depicted in FIGS. 1-5, the slip ring apparatus (20) is configured to be serviceable from the exterior (204) of the housing (202) without disassembling the apparatus (20). More particularly, in the exemplary embodiment, the slip ring contact assemblies (24) are insertable and removable from the interior (206) of the housing (202) via the exterior recess sides (62) of the contact assembly recesses (60) in order to facilitate servicing of the slip ring apparatus (20).

In the exemplary embodiment, the ability to service the slip ring apparatus (20) from the exterior (204) of the housing (202) is achieved by providing the contact assembly recesses (60) and by configuring the contact assembly recesses (60) and the slip ring contact assemblies (24) so that the slip ring contact assemblies (24) are insertable and removable through the contact assembly recesses (60) via the exterior recess sides (62) of the contact assembly recesses (60) and are mountable and dismountable within the interior (206) of the housing (202) via the exterior recess sides (62) of the contact assembly recesses (60).

In the exemplary embodiment, servicing the slip ring apparatus (20) may be comprised of adjusting, maintaining, repairing and/or replacing a slip ring contact assembly (24). In some circumstances, servicing the slip ring apparatus (20) may be comprised of performing adjustments, maintenance and/or repair of the slip ring rotor assembly (22), to the extent that such adjustments, maintenance and/or repair are possible via the exterior recess sides (62) of the contact assembly recesses (60).

Adjusting a slip ring contact assembly (24) may be comprised of adjusting an engagement force between the slip ring rotor assembly (22) and the slip ring contact assembly (24). Maintaining a slip ring contact assembly (24) may be comprised of cleaning or adjusting components of the slip ring contact assembly (24). Repairing a slip ring contact assembly (24) may be comprised of repairing or replacing components of the slip ring contact assembly (24). Replacing a slip ring contact assembly (24) may be comprised of removing the slip ring contact assembly (24) and replacing the slip ring contact assembly (24) with a replacement slip ring contact assembly (24).

With respect to adjusting a slip ring contact assembly (24), the slip ring contact elements (72) and thus the slip ring contact assemblies (24) engage the conductive rings (70) and thus the slip ring rotor assembly (22) with an engagement force. In the exemplary embodiment, the engagement force is adjustable in order to counteract a potential hydroplaning effect between the contact elements (72) and the conductive rings (70), which may vary with the viscosity of the dielectric fluid (82). As a result, the engagement force may be adjusted in order to accommodate varying viscosities of dielectric fluid (82) which may be contained within the dielectric fluid chamber (80).

The engagement force may be adjusted in any suitable manner. As non-limiting examples, in the exemplary embodiment, the engagement force may be adjusted by varying the distance between the slip ring contact assemblies (24) and the slip ring rotor assembly (22), by varying the angle between the contact elements (72) and the conductive rings (70), and/or by varying the physical dimensions or properties of the contact elements (72).

In the exemplary embodiment, the engagement force between the slip ring rotor assembly (22) and a slip ring contact assembly (24) may be adjusted via the exterior recess side (62) of its respective contact assembly recess (60) either while the slip ring contact assembly (24) is mounted within the housing (202) or after removing the slip ring contact assembly (24) from the interior (206) of the housing (202), as required by the nature of the adjustment which is necessary.

In the exemplary embodiment, a slip ring contact assembly (24) may be maintained and/or repaired via the exterior recess side (62) of its respective contact assembly recess (60) either while the slip ring contact assembly (24) is mounted within the housing (202) or after removing the slip ring contact assembly (24) from the interior (206) of the housing (202), as required by the nature of the maintenance and repair which is necessary.

In the exemplary embodiment, a slip ring contact assembly (24) may be replaced via the exterior recess side (62) of its respective contact assembly recess (60) by removing the slip ring contact assembly (24) from the interior (206) of the housing (202) and replacing the slip ring contact assembly (24) with a replacement slip ring contact assembly (24).

In the exemplary embodiment, servicing the slip ring apparatus (20) may therefore be comprised of the following:

(a) removing a hatch cover (100) from a contact assembly recess (60) via the exterior recess side (62) of the contact assembly recess (60), by removing the retaining ring (102) and removing the hatch cover (100) from the contact assembly recess (60);

(b) servicing the slip ring apparatus (20) via the exterior recess side (62) of the contact assembly recess (62); and (c) replacing the hatch cover (100) via the exterior recess side (62) of the contact assembly recess (60), by replacing the hatch cover (100) over the contact assembly recess (60) and replacing the retaining ring (102).

In the exemplary embodiment, replacing a slip ring contact assembly (24) while servicing a slip ring apparatus (20) may be comprised of the following:

(d) dismounting the slip ring contact assembly (24) from the interior (206) of the housing (202) via the exterior recess side (62) of the contact assembly recess (60), by removing the mounting screws (40);

(e) removing the slip ring contact assembly (24) from the interior (206) of the housing (202) via the exterior recess side (62) of the contact assembly recess (60), by passing the slip ring contact assembly (24) through the contact assembly recess (60) to the exterior (204) of the housing (202);

(f) inserting a replacement slip ring contact assembly (24) into the interior (206) of the housing (202) via the exterior recess side (62) of the contact assembly recess (60), by passing the replacement slip ring contact assembly (24) through the contact assembly recess (60) into the interior (204) of the housing (202); and (g) mounting the replacement slip ring contact assembly (24) within the interior (206) of the housing (202) via the exterior recess side (62) of the contact assembly recess (60), by replacing the mounting screws (40).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A slip ring apparatus comprising:
   (a) a housing, wherein the housing has an exterior and an interior;
   (b) a contact assembly recess defined by the housing, wherein the contact assembly recess has an exterior recess side which is accessible from the exterior of the housing and wherein the contact assembly recess has an interior recess side which is in communication with the interior of the housing;
   (c) a slip ring rotor assembly contained within the interior of the housing, wherein the slip ring rotor assembly is adjacent to the interior recess side of the contact assembly recess, and wherein the slip ring rotor assembly is rotatable relative to the housing;
   (d) a slip ring contact assembly mounted within the interior of the housing so that the slip ring rotor assembly is rotatable relative to the slip ring contact assembly, wherein the slip ring contact assembly is electrically connected with the slip ring rotor assembly, and wherein the slip ring contact assembly is insertable into the interior of the housing and is removable from the interior of the housing via the exterior recess side of the contact assembly recess; and
   (e) a hatch cover for covering the contact assembly recess and the slip ring contact assembly, wherein the hatch cover is removable and replaceable via the exterior recess side of the contact assembly recess.

2. The apparatus as claimed in claim 1, further comprising a hatch cover seal between the hatch cover and the contact assembly recess.

3. The apparatus as claimed in claim 1, further comprising a dielectric fluid, wherein the slip ring rotor assembly and the slip ring contact assembly are immersed in the dielectric fluid.

4. The apparatus as claimed in claim 3, further comprising a dielectric fluid chamber surrounding the slip ring rotor assembly and the slip ring contact assembly, for containing the dielectric fluid.

5. The apparatus as claimed in claim 1 wherein the slip ring contact assembly engages the slip ring rotor assembly with an engagement force and wherein the engagement force is adjustable via the exterior recess side of the contact assembly recess.

6. The apparatus as claimed in claim 1 wherein the slip ring contact assembly is replaceable via the exterior recess side of the contact assembly recess.

7. The apparatus as claimed in claim 1 wherein the slip ring rotor assembly is comprised of at least one electrically conductive ring, wherein the slip ring contact assembly is comprised of at least one electrically conductive contact element, and wherein the at least one electrically conductive contact element is engaged with the at least one electrically conductive ring so that the slip ring contact assembly is electrically connected with the slip ring rotor assembly.

8. The apparatus as claimed in claim 7 wherein the at least one electrically conductive contact element is engaged with the at least one electrically conductive ring with an engagement force and wherein the engagement force is adjustable via the exterior recess side of the contact assembly recess.

9. A slip ring apparatus comprising:
   (a) a housing, wherein the housing has an exterior and an interior;
   (b) a plurality of contact assembly recesses defined by the housing, wherein the contact assembly recesses each have an exterior recess side which is accessible from the exterior of the housing and wherein the contact assembly recesses each have an interior recess side which is in communication with the interior of the housing;
   (c) a slip ring rotor assembly contained within the interior of the housing, wherein the slip ring rotor assembly is adjacent to the interior recess sides of the contact assembly recesses, and wherein the slip ring rotor assembly is rotatable relative to the housing;
   (d) a plurality of slip ring contact assemblies, wherein each of the slip ring contact assemblies has a corresponding contact assembly recess, wherein the slip ring contact assemblies are mounted within the interior of the housing so that the slip ring rotor assembly is rotatable relative to the slip ring contact assemblies, wherein the slip ring contact assemblies are electrically connected with the slip ring rotor assembly, and wherein each of the slip ring contact assemblies is insertable into the interior of the housing and is removable from the interior of the housing via the exterior recess side of its corresponding contact assembly recess; and
   (e) a plurality of hatch covers for covering the contact assembly recesses and the slip ring contact assemblies, wherein the hatch covers are removable and replaceable via the exterior recess sides of the contact assembly recesses.

10. The apparatus as claimed in claim 9, further comprising a hatch cover seal between each of the hatch covers and each of the contact assembly recesses.

11. The apparatus as claimed in claim 9, further comprising a dielectric fluid, wherein the slip ring rotor assembly and the slip ring contact assemblies are immersed in the dielectric fluid.

12. The apparatus as claimed in claim 11, further comprising a dielectric fluid chamber surrounding the slip ring rotor assembly and the slip ring contact assemblies, for containing the dielectric fluid.

13. The apparatus as claimed in claim 9 wherein each of the slip ring contact assemblies engages the slip ring rotor assembly with an engagement force and wherein the engagement force is adjustable via the exterior recess sides of the contact assembly recesses.

14. The apparatus as claimed in claim 9 wherein each of the slip ring contact assemblies is replaceable via the exterior recess sides of the contact assembly recesses.

15. The apparatus as claimed in claim 9 wherein the plurality of contact assembly recesses is equally spaced around a circumference of the housing.

16. An apparatus comprising:
   (a) a housing, wherein the housing has an exterior and an interior;
   (b) a shaft rotatably extending through the interior of the housing;
   (c) a contact assembly recess defined by the housing, wherein the contact assembly recess has an exterior recess side which is accessible from the exterior of the housing and wherein the contact assembly recess has an interior recess side which is in communication with the interior of the housing;
   (d) a slip ring rotor assembly contained within the interior of the housing and connected with the shaft, wherein the slip ring rotor assembly is adjacent to the interior recess side of the contact assembly recess, and wherein the slip ring rotor assembly is rotatable relative to the housing;
   (e) a slip ring contact assembly mounted within the interior of the housing so that the slip ring rotor assembly is rotatable relative to the slip ring contact assembly, wherein the slip ring contact assembly is electrically connected with the slip ring rotor assembly, and wherein the slip ring contact assembly is insertable into the interior of the housing and is removable from the interior of the housing via the exterior recess side of the contact assembly recess; and
   (f) a hatch cover for covering the contact assembly recess and the slip ring contact assembly, wherein the hatch cover is removable and replaceable via the exterior recess side of the contact assembly recess.

17. The apparatus as claimed in claim 16 wherein the apparatus is an apparatus for use in drilling a borehole.

18. The apparatus as claimed in claim 16 wherein the apparatus is a rotary steerable drilling apparatus for use in drilling a borehole.

19. A method of servicing a slip ring apparatus comprising a contact assembly recess defined by a housing, the contact assembly recess having an exterior recess side which is accessible from an exterior of the housing and an interior recess side which is in communication with an interior of the housing, a slip ring rotor assembly contained within the interior of the housing adjacent to the interior recess side of the contact assembly recess, wherein the slip ring rotor assembly is rotatable relative to the housing, a slip ring contact assembly mounted within the interior of the housing so that the slip ring rotor assembly is rotatable relative to the slip ring contact assembly, wherein the slip ring contact assembly is electrically connected with the slip ring rotor assembly, and a hatch cover covering the contact assembly recess and the slip ring contact assembly, the method comprising:
   (a) removing the hatch cover via the exterior recess side of the contact assembly recess;
   (b) servicing the slip ring apparatus via the exterior recess side of the contact assembly recess; and
   (c) replacing the hatch cover via the exterior recess side of the contact assembly recess.

20. The method as claimed in claim 19 wherein the slip ring contact assembly engages the slip ring rotor assembly with an engagement force and wherein servicing the slip ring apparatus is comprised of adjusting the engagement force via the exterior recess side of the contact assembly recess.

21. The method as claimed in claim 19 wherein servicing the slip ring apparatus is comprised of replacing the slip ring contact assembly with a replacement slip ring contact assembly via the exterior recess side of the contact assembly recess.

22. The method as claimed in claim 21 wherein replacing the slip ring contact assembly is comprised of:
   (d) dismounting the slip ring contact assembly from the interior of the housing via the exterior recess side of the contact assembly recess;
   (e) removing the slip ring contact assembly from the interior of the housing via the exterior recess side of the contact assembly recess;
   (f) inserting the replacement slip ring contact assembly into the interior of the housing via the exterior recess side of the contact assembly recess; and
   (g) mounting the replacement slip ring contact assembly within the interior of the housing via the exterior recess side of the contact assembly recess.

23. The method as claimed in claim 19 wherein servicing the slip ring apparatus is comprised of repairing the slip ring contact assembly.

* * * * *